UNITED STATES PATENT OFFICE.

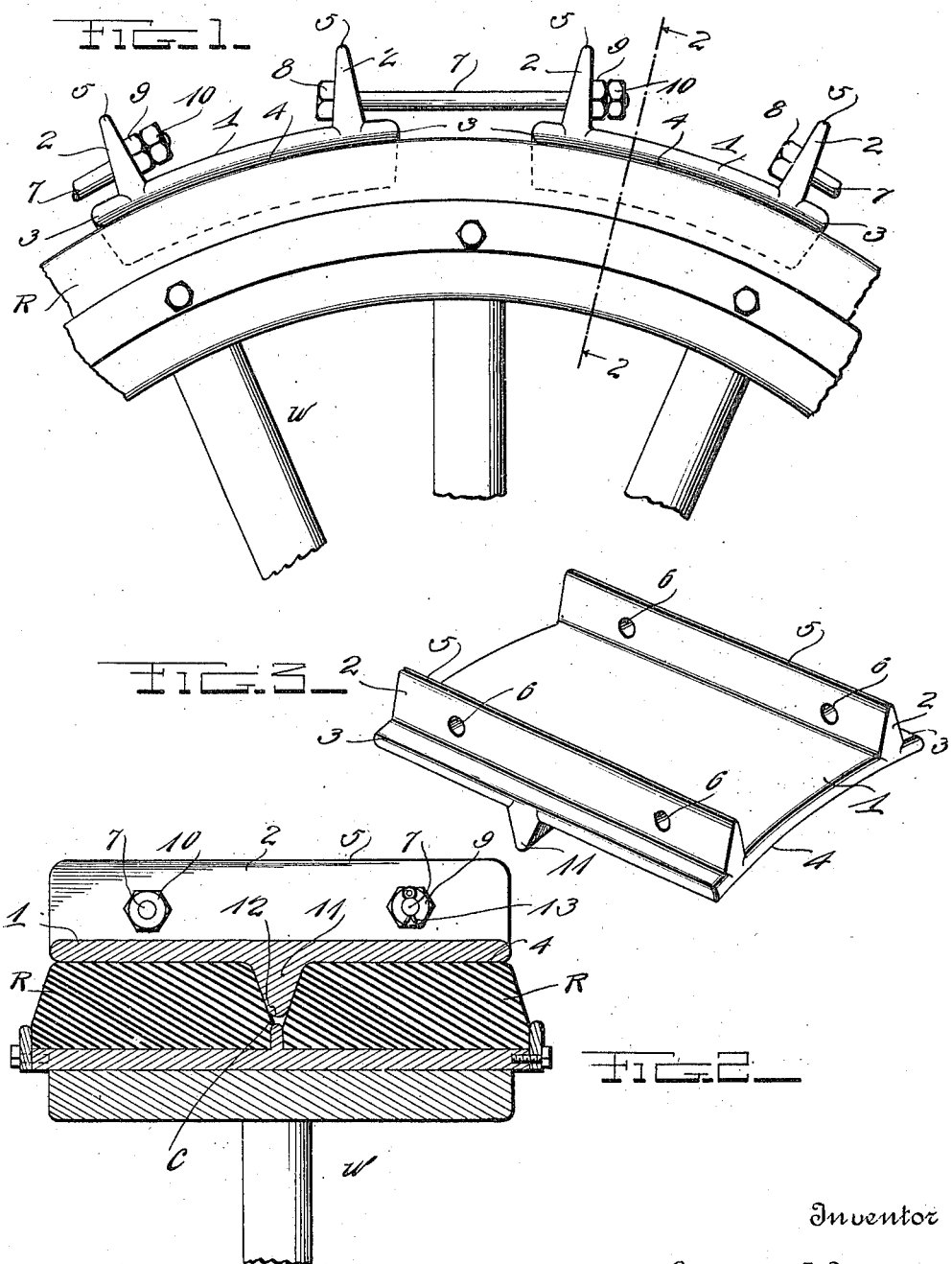

ORLANDO MOORE, OF VISALIA, CALIFORNIA.

DETACHABLE TREAD.

1,030,113. Specification of Letters Patent. Patented June 18, 1912.

Application filed February 15, 1912. Serial No. 677,728.

*To all whom it may concern:*

Be it known that I, ORLANDO MOORE, a citizen of the United States, residing at Visalia, in the county of Tulare and State of California, have invented certain new and useful Improvements in Detachable Treads; and I do declare the following to be a full, clear, and exact description of the invention, such as will enable others skilled in the art to which it appertains to make and use the same.

This invention relates to resilient wheels and tires, and more especially to cushion tires such as are used on large trucks and vans ordinarily driven by a gasolene motor; and the object of the same is to provide a detachable or removable tread of metal plates which may be secured over the face of such a cushion tire to prevent wear and slipping. This and other objects are accomplished by the construction hereinafter more fully described and claimed, and as shown in the drawings wherein—

Figure 1 is a side elevation of a portion of a wheel rim with this improved tread attached to its tire. Fig. 2 is an enlarged cross section on the line 2—2 of Fig. 1. Fig. 3 is a perspective detail of one of the plates removed.

In the drawings the letter W designates the driving wheel of a motor driven truck of that class whose tires are composed of two rather thick flat rubber bands R surrounding the wheel rim and spaced apart slightly to produce an annular groove C, and it is to cushion tires of this character that my improved tread is intended for application.

The tread consists of a number of rough plates, preferably ordinary iron castings, and flexible connections which join them together in a band adapted to be slipped over the tire of the wheel. Each plate has a body 1 which is substantially rectangular in plan view although it is slightly curved longitudinally to conform with the curvature of the wheel rim, and across the outer face of the body are formed two ribs 2 disposed preferably near the edges 3 of said body and outstanding from the latter radial to the curve on which its inner face 4 is struck, each rib preferably tapering slightly outward to a rather sharp edge 5 as shown. The ribs are pierced with two holes 6, one near each end of the rib, and the adjacent plates are connected by passing bolts 7 through a pair of such holes so that the head 8 of each bolt will stand within the rib of one plate and the nut 9 thereof within the rib of the next adjacent plate. Finally the nuts are tightened up, and jam nuts 10 or cotter pins 13 are applied to keep them from being lost. The length of the bolts is such that the adjacent ribs on two contiguous plates will stand as far from each other as the two ribs on any one plate, with the result that all ribs around a tread thus formed are equally spaced.

In use, several of the nuts are loosened so that the anti-slipping tread may be passed over the periphery of the two rubber bands R, after which all nuts are tightened up in a manner which will be clear.

An important detail of construction consists in providing a fin 11 projecting from and preferably cast integral with the curved inner face 4 of each plate and extending along the same on a line at right angles to the direction of the two ribs, these fins partaking of the curvature of said inner face and by preference also each tapering slightly to its outer edge 12 which is rather sharp but not too much so. In the application of this improved detachable tread to a cushion tire composed of two rubber bands R, the same must be enlarged by loosening several of the nuts sufficiently to permit the various fins to be passed over the outermost band R and entered into the groove C between the two bands, and afterward the several nuts and jam nuts will be tightened up as described and it will be found impossible for the detachable tread to become lost laterally off of the wheel. Thus is produced a detachable tread which will prolong the life of a cushion tire of this character by taking the wear off of the tire and avoiding the slipping of the latter on smooth pavements or the cutting of the same by ice and the like. Furthermore the use of treads of this character on the driving wheels converts a heavy auto truck into a traction engine whose wheels, of course, must not slip upon the surface over which they travel. At any time, however, the treads can be removed, and the vehicle again becomes a truck.

What is claimed as new is:

The herein described detachable tread made up of a series of metal plates each rectangular in contour and curved in one direction, an integral inwardly projecting fin on the dished side of each plate extending from end to end thereof along the line of its curvature about midway between its edges, and a pair of radially projecting ribs extending integrally from the outer side of the plate near those edges thereof which are adjacent the ends of said fin, each rib being pierced with two holes; and a pair of bolts extending through alined holes in the adjacent ribs of contiguous plates, the length of the bolts being such that contiguous ribs on adjacent plates will be spaced about the same as the two ribs on any one plate, for the purpose set forth.

In testimony whereof I have hereunto set my hand in presence of two subscribing witnesses.

ORLANDO MOORE.

Witnesses:
E. I. FEEMSTER,
RALPH H. WALKER.